United States Patent
Harms et al.

(10) Patent No.: US 8,474,485 B2
(45) Date of Patent: Jul. 2, 2013

(54) THREE-POSITION FLUID VALVE FOR DOWNHOLE USE

(75) Inventors: Kent David Harms, Richmond, TX (US); Michael J. Stucker, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1041 days.

(21) Appl. No.: 12/489,974

(22) Filed: Jun. 23, 2009

(65) Prior Publication Data

US 2010/0319779 A1    Dec. 23, 2010

(51) Int. Cl.
*F16K 11/07* (2006.01)

(52) U.S. Cl.
USPC .................. 137/625.48; 137/630.22; 137/14

(58) Field of Classification Search
USPC ............. 137/630.19, 630.22, 630.14, 625.64, 137/625.65, 883, 625.48, 625.49, 112, 113, 137/862, 869–871, 882, 625.66, 625.25, 137/625.42, 155, 487, 488, 87.05, 87.06, 137/14; 251/129.19; 166/334.4
See application file for complete search history.

(56) References Cited

U.S. PATENT DOCUMENTS

| | | | | |
|---|---|---|---|---|
| 2,691,964 A * | 10/1954 | Stickney | ...................... | 137/862 |
| 2,743,900 A * | 5/1956 | Holzer et al. | ............ | 137/625.48 |
| 3,283,783 A * | 11/1966 | Kent | ....................... | 137/625.42 |
| 4,061,155 A * | 12/1977 | Sopha | ..................... | 137/625.62 |
| 4,343,601 A * | 8/1982 | Thorson | ..................... | 137/112 |
| 4,598,626 A * | 7/1986 | Walters et al. | ........... | 137/625.64 |
| 6,371,149 B1 * | 4/2002 | Gust et al. | .................... | 137/112 |
| 6,953,057 B2 * | 10/2005 | Wade | ....................... | 137/625.64 |
| 7,114,562 B2 | 10/2006 | Fisseler et al. | | |
| 2010/0251814 A1 * | 10/2010 | Baker et al. | ................... | 137/554 |

* cited by examiner

*Primary Examiner* — Craig Schneider
*Assistant Examiner* — Craig J Price
(74) *Attorney, Agent, or Firm* — Cathy Hewitt; John Vereb (57) ABSTRACT

Three-position fluid valves for use in downhole environments are disclosed. An example valve includes first, second and third ports, a chamber coupled to the second port, a first sleeve to selectively couple the first port to the chamber and the second port, a second sleeve to selectively couple the third port to the chamber and the second port, and a piston that forms at least part of the chamber and is coupled to the sleeves. The piston moves between a first position in which the piston displaces the first sleeve to couple the first port to the chamber and the second port, a second position in which neither of the first or third ports is coupled to the second port, and a third position in which the piston displaces the second sleeve to couple the third port to the chamber and the second port.

20 Claims, 11 Drawing Sheets

FIG. 8H

THREE-POSITION FLUID VALVE FOR DOWNHOLE USE

BACKGROUND OF THE DISCLOSURE

In the field of oil production, temperature and pressure conditions in a borehole, as well as internal tool operations, can cause changes in fluid pressures. Fluid routing systems are often used to equalize pressure and route fluid between different regions of a borehole and/or between the inner and outer portions of a drillstring or tool. Present valves used to route fluids in downhole environments are prone to seal extrusion when used to equalize pressure. Valves may also be subject to erosion when used to route fluid, and may clog when used to route dirty fluids. The seal may become extruded and damaged when opening the valve and/or eroded if not properly protected. In some other known fluid valve designs, a protective sleeve may be used to prevent seal extrusion, but such fluid valves only have two effective positions or states.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The example three-position fluid valves described herein allow dirty fluid routing and/or high-pressure equalization in a downhole drilling or measuring environment. More specifically, the example three-position fluid valves may be used to facilitate fluid sampling operations in downhole environments. The example three-position fluid valves described herein may include a motor or any other actuating device to move a piston to one of three positions to selectively fluidly couple a first or common port to one of two other (e.g., second and third) ports or to isolate the first port from the two other ports. Specifically, in a first position, the first port is fluidly decoupled or isolated from both of the other ports. In a second position, the first port is fluidly coupled to a first one of the other ports and, in a third position, the first port is fluidly coupled to the second one of the other ports.

The example three-position fluid valves described herein include protective sleeves on each end of the piston to protect one or more seals and/or the piston from erosion and seal extrusion. Additionally, the protective sleeves allow the example fluid valves to provide high-pressure equalization independent of a pressure differential direction across the ports of the valves. The example protective sleeves described herein may contact the end of a piston bore. Springs may be used to exert pressure on the sleeves to urge the sleeves into contact with the piston bore. When the piston and seal(s) enter one of the sleeves, the seal(s) are also protected from pressure or erosion. In operation, to fluidly couple the first port to one of the other ports, a portion of the piston and the seal(s) around the piston may be moved into a respective one of the sleeves to begin pressure equalization. The piston may then be moved further toward the sleeve to push or displace the sleeve away from the piston bore to fluidly couple the respective one of the second or third ports to the first port. The piston may displace the sleeve to allow dirty downhole fluid particles to flow without clogging. Additionally, the protective sleeves and the piston bore areas surrounding the point of fluid coupling may be constructed using materials that are wear-resistant and easily replaceable to prevent erosion.

In the examples described herein, the piston and the piston bore may form a movable chamber to selectively couple the first or common port to one of the other two ports. This movable chamber may remain coupled to the first or common port at all times (i.e., for all positions of the piston) and may move in the same direction and distance as the piston. When the piston moves or displaces one of the sleeves, the movable chamber may be fluidly coupled to an end of the piston bore where the respective one of the other ports is located. While the sleeve is displaced, fluid may travel between the first or common port and the one of the other ports to which the first or common port is coupled.

In the examples described below, the first or common port of the example three-position fluid valves described herein is referred to as an inlet port while the other two ports are referred to as outlet ports. However, such nomenclature for the ports has been used only for purposes of facilitating an understanding of the example three-position fluid valves described herein. Accordingly, it should be understood that other nomenclature may be used to refer to the three ports of the example valves without departing from the scope of this disclosure.

Figure 1:
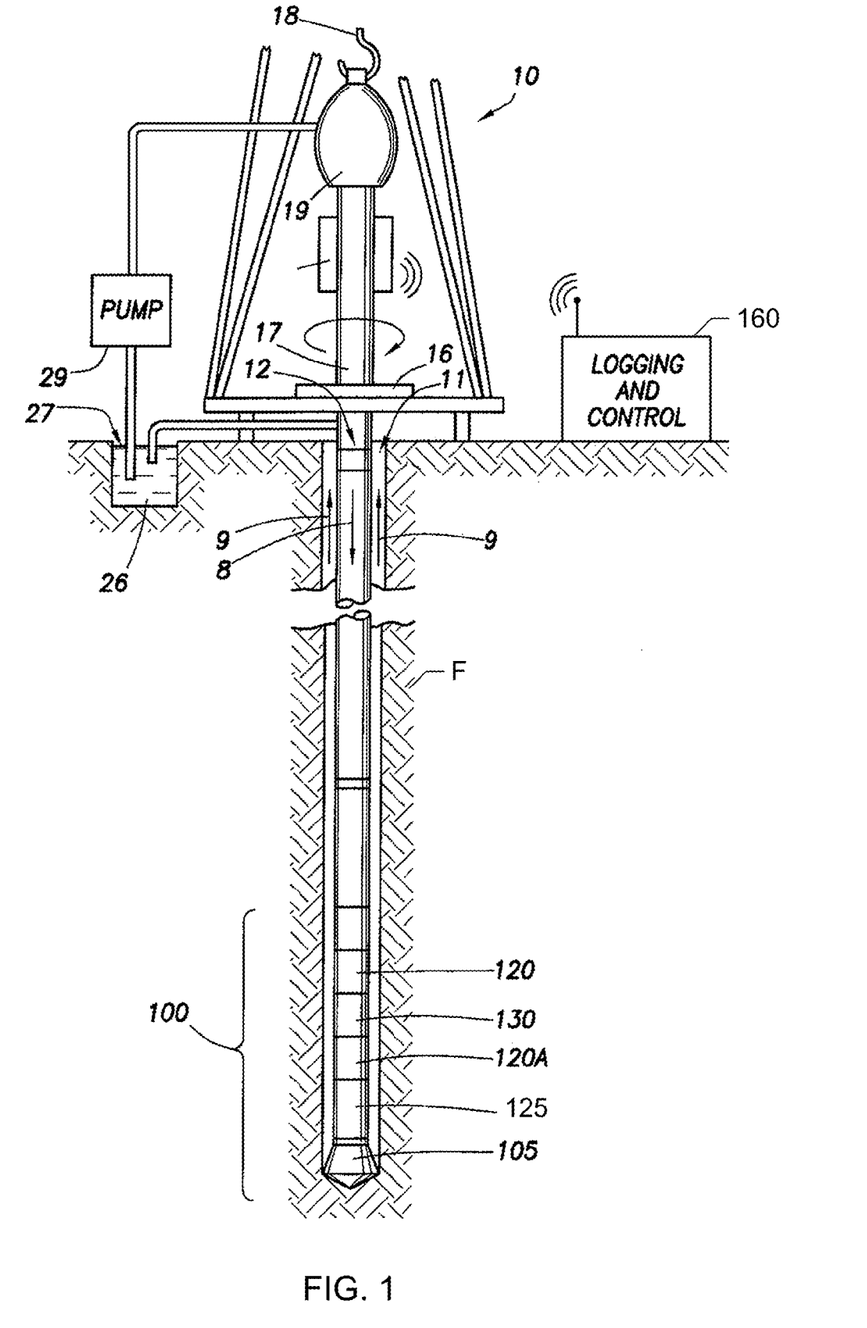
FIG. 1 is a schematic view of an example wellsite drilling system according to one or more aspects of the present disclosure.

FIG. 1 illustrates an example wellsite drilling system that can be employed onshore and/or offshore. In the example wellsite system of FIG. 1, a borehole 11 is formed in one or more subsurface formations by rotary and/or directional drilling.

As illustrated in FIG. 1, a drillstring 12 is suspended in the borehole 11 and has a bottom hole assembly (BHA) 100 having a drill bit 105 at its lower end. A surface system includes a platform and derrick assembly 10 positioned over the borehole 11. The derrick assembly 10 includes a rotary table 16, a kelly 17, a hook 18 and a rotary swivel 19. The drillstring 12 is rotated by the rotary table 16, energized by means not shown, which engages the kelly 17 at an upper end of the drillstring 12. The example drillstring 12 is suspended from the hook 18, which is attached to a traveling block (not shown), and through the kelly 17 and the rotary swivel 19, which permits rotation of the drillstring 12 relative to the hook 18. Additionally or alternatively, a top drive system could be used.

In the example depicted in FIG. 1, the surface system further includes drilling fluid 26, which is commonly referred to in the industry as "mud," which is stored in a pit 27 formed at the well site. A pump 29 delivers the drilling fluid 26 to the interior of the drillstring 12 via a port in the rotary swivel 19, causing the drilling fluid 26 to flow downwardly through the drillstring 12 as indicated by directional arrow 8. The drilling fluid 26 exits the drillstring 12 via ports in the drill bit 105, and then circulates upwardly through the annulus region between the outside of the drillstring 12 and the wall of the borehole 11 as indicated by directional arrows 9. The drilling fluid 26 lubricates the drill bit 105, carries formation cuttings up to the surface as it is returned to the pit 27 for recirculation, and creates a mudcake layer (not shown) (e.g., filter cake) on the walls of the borehole 11.

The example bottom hole assembly 100 of FIG. 1 includes, among other things, any number and/or type(s) of logging-while-drilling (LWD) modules or tools (two of which are designated by reference numerals 120 and 120A) and/or measuring-while-drilling (MWD) modules (one of which is designated by reference numeral 130), a rotary-steerable system or mud motor 125 and the example drill bit 105. The MWD module 130 measures the drill bit 105 azimuth and inclination that may be used to monitor the borehole trajectory.

The example LWD tools 120 and 120A of FIG. 1 are each housed in a special type of drill collar, as it is known in the art, and each contain any number of logging tools and/or fluid sampling devices. The example LWD tools 120 and 120A include capabilities for measuring, processing and/or storing information, as well as for communicating with the MWD module 130 and/or directly with the surface equipment, such as, for example, a logging and control computer 160.

The logging and control computer 160 may include a user interface that enables parameters to be input and or outputs to be displayed that may be associated with an extent of a zone invaded by the drilling fluid (e.g., filtrate), measurements obtained and/or predictions associated with sampling a formation F. While the logging and control computer 160 is depicted uphole and adjacent the wellsite system, a portion or all of the logging and control computer 160 may be positioned in the bottom hole assembly 100 and/or in a remote location.

Figure 2:
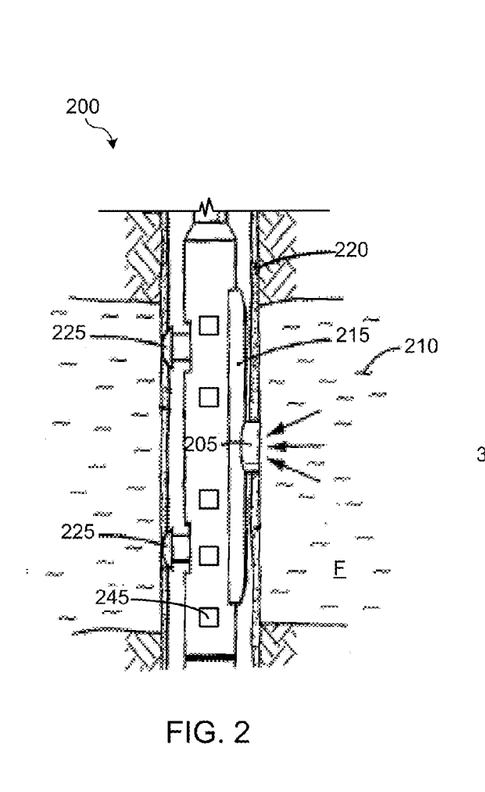
FIG. 2 is a schematic view showing an example manner of implementing either or both of the example logging while drilling modules of FIG. 1 according to one or more aspects of the present disclosure.

FIG. 2 is a simplified diagram of a sampling-while-drilling logging device 200 (LWD tool 200) that may be used to implement the LWD tools 120 and/or 120A. In the illustrated example, the LWD tool 200 is of a type described in U.S. Pat. No. 7,114,562, which is assigned to the assignee of the present patent and incorporated herein by reference in its entirety. However, other types of LWD tools can be used to implement the LWD tool 200 or part of an LWD tool.

The example LWD tool 200 of FIG. 2 is provided with a probe 205 configured to establish fluid communication with the formation F and to draw a fluid 210 into the LWD tool 200, as indicated by the arrows. The example probe 205 may be positioned, for example, within a stabilizer blade 215 of the LWD tool 200 and extend from the stabilizer blade 215 to engage a borehole wall 220. The example stabilizer blade 215 comprises one or more blades that are in contact with the borehole wall 220.

The LWD tool 200 may be provided with devices such as, for example, a chamber 245 for collecting fluid samples for retrieval at the surface. Backup pistons 225 may also be provided to assist in applying force to push the LWD tool 200 and/or the probe 205 against the borehole wall 220.

Figure 3:
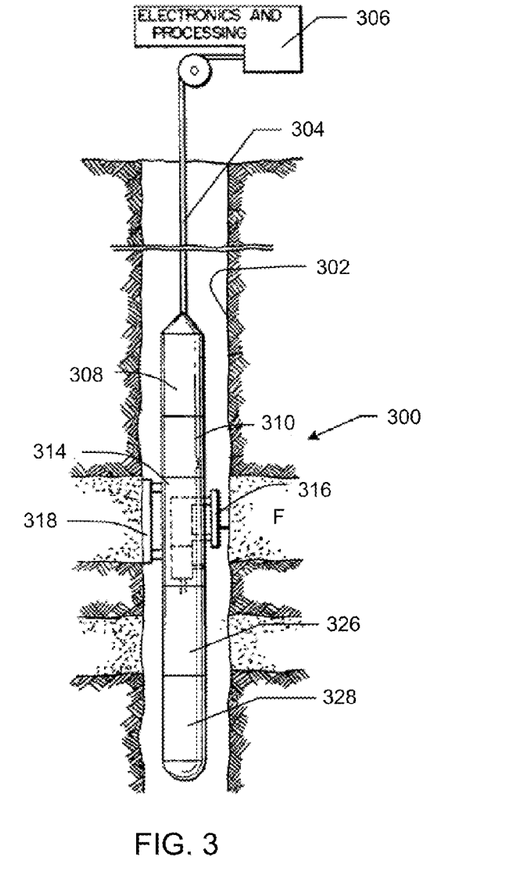
FIG. 3 is a schematic view of an example wireline measurement tool suspended in a borehole according to one or more aspects of the present disclosure.

FIG. 3 is an example wireline tool 300 that may be another environment in which aspects of the present disclosure may be implemented. The example wireline tool 300 is suspended in a wellbore 302 from the lower end of a multiconductor cable 304 that is spooled on a winch (not shown) at the Earth's surface. At the surface, the cable 304 is communicatively coupled to an electronics and processing system 306. The example wireline tool 300 includes an elongated body 308 that includes a formation tester 314 having a selectively extendable probe assembly 316 and a selectively extendable tool anchoring member 318 that are arranged on opposite sides of the elongated body 308. Additional components (e.g., 310) may also be included in the tool 300.

One or more aspects of the probe assembly 316 may be substantially similar to those described above in FIGS. 1 and 2. For example, the extendable probe assembly 316 is configured to selectively seal off or isolate selected portions of the wall of the wellbore 302 to fluidly couple to the adjacent formation F and/or to draw fluid samples from the formation F. The formation fluid may be expelled through a port (not shown) or it may be sent to one or more fluid collecting chambers 326 and 328. In the illustrated example, the electronics and processing system 306 and/or a downhole control system are configured to control the extendable probe assembly 316 and/or the drawing of a fluid sample from the formation F.

Figure 4:
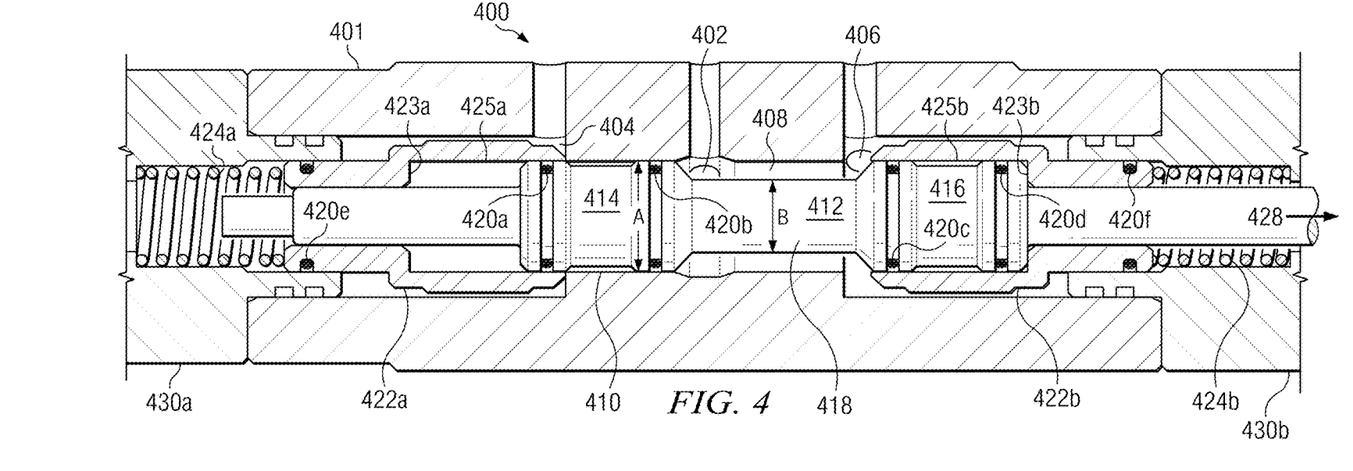
FIG. 4 is a cross-sectional schematic view of an example drilling or wireline tool including a three-position fluid valve according to one or more aspects of the present disclosure.

FIG. 4 is a cross-sectional schematic view of an example drilling or wireline tool including an example three-position fluid valve 400. The example fluid valve 400 of FIG. 4 may be used in a drillstring or a wireline tool to prepare a sampling line for sampling downhole formation fluids, to collect the downhole formation fluids and/or to equalize a sampling probe pressure relative to an annulus region. Additionally or alternatively, the example fluid valve 400 may be used to route downhole fluids, to equalize pressure between downhole fluids, to separate sample fluids from contaminated fluids and/or for any other purpose.

As described with reference to FIG. 2, a probe 205 is extended from a downhole tool and fluidly coupled to a formation F. In many downhole fluid sampling applications, it is desirable to obtain a clean fluid sample. However, the fluid initially collected by the probe 205 is often contaminated with drilling fluid. Thus, the example three-position fluid valve 400 may be used to route undesired, dirty fluid from probe 205 to the annulus. When the fluid is clean and an appropriate sample may be collected, the example fluid valve 400 routes fluid to a sampling chamber or isolates the sampling chamber to prevent fluid from bypassing the sampling chamber. When the sample has been collected, the example fluid valve 400 equalizes the pressure at the probe 205 to facilitate the extraction or decoupling of the probe 205 from the formation F. An example sampling implementation is described in detail below with reference to FIG. 5F. The example three-position fluid valve 400 may also be used advantageously to increase or decrease pressure of drilling fluid by routing the drilling fluid into or out of the annulus region via the drillstring. Alternatively or additionally, the example three-position fluid valve 400 may be used to control drill bit speed by controlling fluid pressure, to inflate or deflate a packer using drilling fluid and/or to route drilling fluid to any other tool or location on a drillstring.

The example fluid valve 400 is implemented in a housing 401 and may be used to route downhole fluids between an inlet port 402 and one of two outlet ports 404 and 406. The housing 401 provides structural support to the valve 400 and provides means to mechanically couple the valve 400 to a drillstring (e.g., the drillstring 12 of FIG. 1) and/or a wireline tool (e.g., the tool 300 of FIG. 3). The valve 400 includes a piston bore 410 and a piston 412 to move within the bore 410. As described in more detail in connection with FIGS. 6A-6D, the inlet port 402 includes one or more fluid passages between the bore 410 and the outside of the housing 401. Similarly, the outlet ports 404 and 406 include one or more fluid passages between a respective side of the bore 410 and the outside of the housing 401.

The inlet port 402 permits fluids to enter a chamber 408 that is fluidly coupled to the inlet port 402. In the illustrated example, the chamber 408 includes the portion of the cylindrical piston bore 410 not occupied by the piston 412. The piston 412 moves within the bore 410 to fluidly couple the chamber 408 to one of the outlet ports 404 or 406, or to a neutral position in which the chamber 408 is not coupled to either of the outlet ports 404 or 406 (i.e., is isolated from the outlet ports 404 and 406).

The piston 412 includes two outer portions 414 and 416 having a greater diameter A coupled by a portion 418 having a relatively smaller diameter B. The portion 418 is sized (e.g., has a relatively smaller diameter) to provide space within the bore 410 to implement the chamber 408. The example space between the bore 410 and the chamber 408 includes sufficient flow area for fluids to prevent clogging. Thus, as the piston 412 moves relative to the inlet port 402, the outlet ports 404 and 406, and the bore 410, the chamber 408 moves in the same direction and the same distance as the piston 412. In this manner, the chamber 408 operates as a movable extension of the inlet port 402.

To prevent the outlet ports 404 and 406 from becoming fluidly coupled to the chamber 408 at undesired times, the example piston 412 is fitted with seals 420a-420d. The illustrated seals 420a-420d may be implemented using, for example, o-rings captured between the piston 412 and the bore 410. The example seals 420a-420d are coupled circumferentially to the piston 412. During the example assembly process described below in connection with FIGS. 7 and 8A-8H, the seals 420a-420d are captured between the bore 410 and the piston 412 upon insertion of the piston 412 into the bore 410. The example seals 420a-420d have substantially equal diameters to prevent a net pressure on the piston 412. In other words, because the seals 420a-420d have substantially equal diameters, there is no effective area for fluid pressure to bias the piston 412 in either direction.

The example fluid valve 400 also includes protective sleeves 422a and 422b which, in addition to the seals 420a-420d, further decouple the chamber 408 from the outlet ports 404 and 406. The sleeves 422a and 422b have respective bores 425a and 425b, each of which has an inner diameter substantially equal to the inner diameter of the piston bore 410. Thus, in operation, the piston 412 and the seals 420a-420d traverse a substantially continuous cylindrical bore extending between the bore 410 and into the bores 425a and 425b of the respective sleeves 422a and 422b.

In operation, the piston 412 engages only one of the sleeves 422a or 422b at a time. For example, to engage the sleeve 422a, the piston section 414 enters the bore 425a of the sleeve 422a. As the piston 412 continues to move toward and into the sleeve 422a, the piston section 414 contacts a shoulder 423a of the sleeve 422a (i.e., moves the sleeve 422a to the left in FIG. 4) and displaces the sleeve 422a out of contact with the bore 410. As the sleeve 422a is displaced, the chamber 408 moves partially out of the bore 410 and into fluid communication with the outlet port 404. When the sleeve 422a is displaced to the left, the chamber 408 is fluidly coupled to the outlet port 404, thereby allowing fluid to flow freely between the inlet port 402 and the outlet port 404.

When the piston 412 is disengaged from the sleeves 422a and 422b, springs 424a and 424b urge the respective sleeves 422a and 422b into contact with the piston bore 410. The springs 424a and 424b may be configured to, have a spring constant or rate that is selected based on the maximum pressure to be balanced via the fluid valve 400. Greater pressures may cause higher seal friction, which may then require a higher spring constant or rate to hold one of the sleeves 422a or 422b in place while the piston 412 moves into the sleeve 422a or 422b.

The piston 412 is generally located in one of three positions at any given time: 1) a first "neutral" position, in which the piston 412 does not contact or impart force to either of the sleeves 422a or 422b and the chamber 408 and the port 402 are fluidly decoupled or isolated from the other ports 404 and 406; 2) a second position in which the piston 412 displaces the sleeve 422a (to the left in FIG. 4) and the chamber 408 is moved to fluidly couple the first outlet port 404 to the inlet port 402; and 3) a third position, in which the piston 412 contacts a shoulder 423b to displace the sleeve 422b (to the right in FIG. 4) and the chamber 408 is moved to fluidly couple the second outlet port 406 to the inlet port 402. The neutral position may be implemented in any one or more positions where the piston 412 does not engage or displace either of the sleeves 422a or 422b and the seals 420b and 420c fluidly decouple the ports 402, 404, and 406. The three example positions noted above are shown and described operatively in more detail below in connection with FIGS. 5A, 5C and 5E.

A motor 428, operatively shown in FIGS. 5A-5E, moves the piston 412 within the bore 410 and to engage and/or displace the sleeves 422a and/or 422b. In some examples, the motor 428 is implemented using a screw motor, which may be used to accurately position the piston 412 by rotating a screw thread. However, any type of motor or actuating device, such as a solenoid, a hydraulic displacement pump or the like, may be used to move the piston 412 between the first, second and third positions.

Configuring the springs 424a and 424b to have relatively larger spring rates or constants can enable larger fluid pressure differences between the inlet 402 and the outlet ports 404 and 406 to be fluidly decoupled via the valve 400. However, larger spring rates or constants may require more force to be applied by the motor 428 to disengage the sleeves 422a and 422b from the bore 410. In contrast, smaller spring rates or constants require less force from the motor 428 to displace the sleeves 422a and 422b. Smaller spring rates or constants may be used, for example, in applications where low pressure differences between the inlet 402 and the outlet ports 404 and 406 are expected.

The example springs 424a and 424b of the fluid valve 400 shown in FIG. 4 are immersed in an oil and sealed from exposure to the drilling fluid. The example seals 420a and 420d prevent drilling fluid from accessing the springs 424a and 424b via the sleeves 422a and 422b, respectively. Additional seals 420e and 420f also prevent drilling fluid from accessing the springs 424a and 424b, respectively, from the ports 404 and 406. The springs 424a and 424b may also be immersed in or surrounded by a lubricant, air, a gas, a non-drilling fluid, or any other suitable fluid. In another implementation, the springs 424a and 424b are immersed in the drilling fluid via the ports 404 and 406 and/or via the sleeves 422a and 422b. In such an implementation, the seals 420a and 420d may be omitted.

Contact switches (not shown) at the ends of the piston 412 may be provided to signal that the piston 412 has moved substantially to the end of its range of motion. When one of the contact switches makes contact with a corresponding contact switch (not shown), a control module (not shown) stops the motor 428 from moving the piston 412 further. Additionally or alternatively, the motor (or other actuation device) 428 senses when the piston 412 stops via torque or force feedback and then interpolates one or more neutral positions of the piston 412.

As described in more detail below with respect to FIGS. 8A-8I, end caps 430a and 430b may be installed on the ends of the example three-position fluid valve 400 during assembly. The end caps 430a and 430b may be fastened to the housing 401 to retain the respective springs 424a and 424b.

Downhole fluids, such as dirty drilling mud and/or contaminated sampling fluid, often have abrasive particulate matter such as sand, grit, stone, or other matter that can cause erosion of seals and/or other components. If the inlet 402 and the outlet ports 404 and 406 were to concentrate fluid flow over any particular regions of the piston 412, the bore 410, and/or the seals 420a-420d, those regions may be significantly extruded and/or eroded due to uneven exposure to the abrasive matter in the fluid. Accordingly, the inlet 402 and the outlet ports 404 and 406 are configured to include sufficient flow area and appropriate port configurations to reduce fluid flow speed and concentration of flow over any particular region.

Further, lubricant may be added to the piston bore 410 and/or the piston 412 to facilitate smooth movement of the piston 412. The lubricant may be added, for example, during the assembly process described below. Additionally or alternatively, the downhole fluid in the chamber 408 may operate as a lubricant. Additionally, the springs 424a and 424b may be immersed in fluid or may be surrounded by air.

To better understand the operation of the example fluid valve 400 of FIG. 4, FIGS. 5A-5E depict simplified functional diagrams of the fluid valve 400. In particular, FIGS. 5A-5E include the example inlet 402 and the outlet ports 404 and 406, the example chamber 408, the example piston bore 410, the example piston 412, the example seals 420a-420f, the example sleeves 422a and 422b and the example springs 424a and 424b.

Figure 5A:
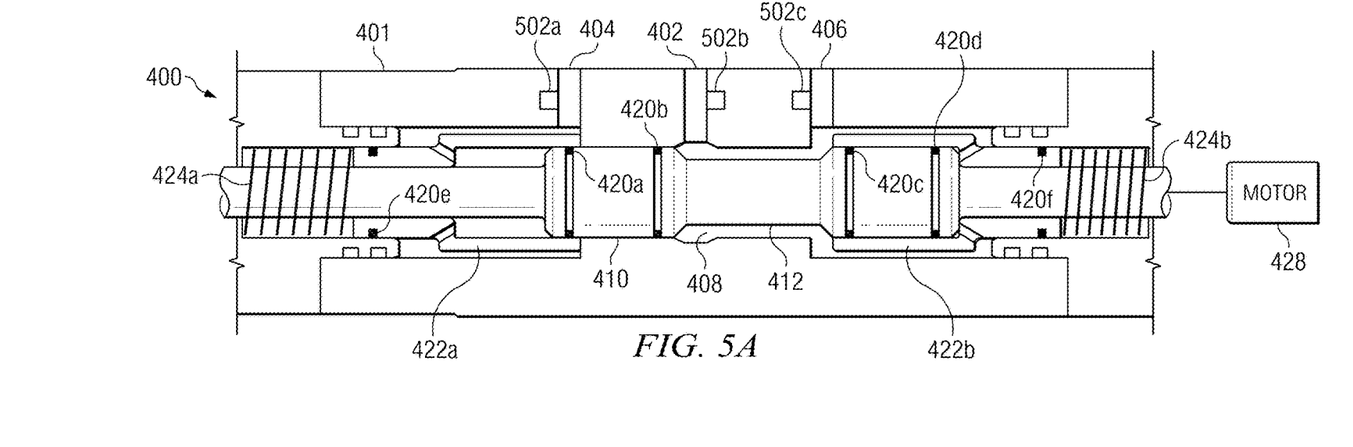
FIG. 5A is an illustration of the three-position fluid valve of FIG. 4 engaged with a first sleeve to couple a chamber to an outlet port according to one or more aspects of the present disclosure.

FIG. 5A is a simplified illustration of the three-position fluid valve 400 of FIG. 4 where the piston 412 is engaged with the sleeve 422b to fully fluidly couple the chamber 408 to the outlet port 406. The piston 412 displaces the sleeve 422b in a manner similar to that described in connection with FIG. 4. The chamber 408 moves as the piston 412 moves and fluidly couples the inlet port 402 to the outlet port 406. To displace the sleeve 422b, the motor 428 moves the piston 412 through the bore 410 to engage the sleeve 422b. As the piston 412 engages the sleeve 422b, the seal 420b is protected from erosion and extrusion by the sleeve 422b as illustrated in FIG. 5A. The example valve 400 may also include one or more pressure sensors 502a-502c to determine the relative pressures between the inlet 402 and the outlet ports 404 and 406.

As the piston 412 moves relative to the piston bore 410, the chamber 408 moves in the same direction. The example chamber 408 remains fluidly coupled to the inlet port 402 and becomes fluidly coupled to the outlet port 406 as the piston 412 moves from a neutral position to a position in which the piston 412 has engaged and displaced the sleeve 422b.

When the piston 412 contacts and enters the sleeve 422b, the seal 420c enters the sleeve 422b (and the seal 420d remains in the sleeve 422b). The seal 420a remains in the sleeve 422a to prevent drilling fluid from accessing the spring 424a. Thus, the seal 420c is protected by the sleeve 422b from erosion by movement of dirty fluid and from becoming extruded. When the sleeve 422b is moved away from the piston bore 410, the chamber 408 moves into a position that provides a fluid passage between the outlet port 406 and the inlet port 402. Fluid may then flow between the outlet port 406 and the inlet port 402 via the chamber 408. Additionally, in this position, the example spring 424b is compressed, and continues to urge the sleeve 422b toward the piston 412.

Figure 5B:
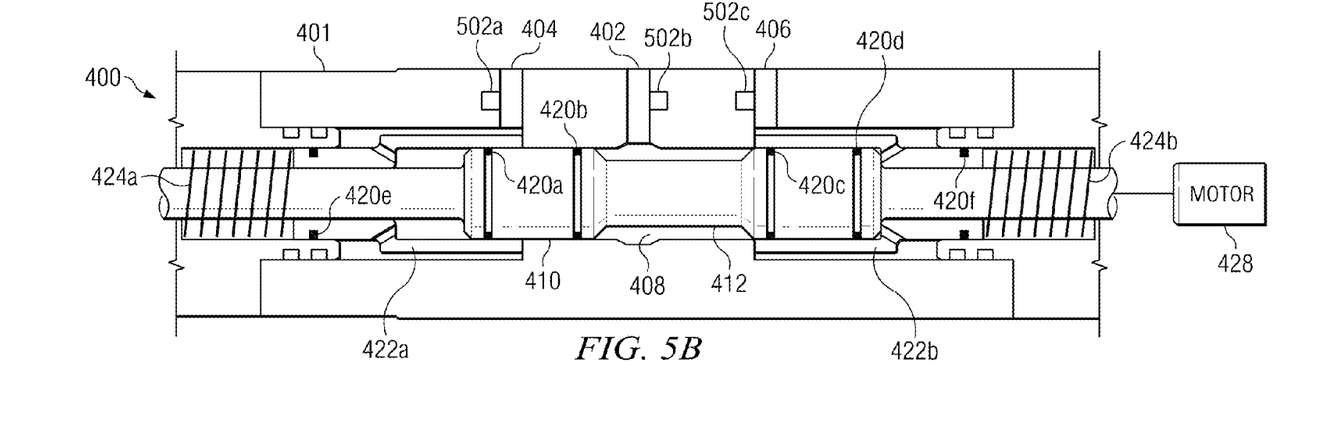
FIG. 5B is an illustration of the three-position fluid valve of FIG. 4 engaged with a first sleeve according to one or more aspects of the present disclosure.

When the motor 428 moves the piston 412 back to a neutral position, the spring 424b urges the sleeve 422b into contact with the piston bore 410 as depicted in FIG. 5B. FIG. 5B is an illustration of the three-position fluid valve 400 of FIG. 4 engaged with the sleeve 422b but has not moved the sleeve 422b to fully fluidly couple the ports 402 and 406 as depicted in FIG. 5A. The example piston 412 is not pushing the sleeve 422b away from the bore 410, so the spring 424b urges the sleeve 422b into contact with the bore 410. While the sleeve 422b is in contact with the piston bore 410, the seals 420c and 420d are protected by the sleeve 422b and do not prevent flow between the ports 402 and 406. The sleeve 422b also does not create a seal with the bore 410. Therefore, downhole fluid may still flow between the ports 402 and 406, but the flow is restricted by the sleeve 422b. The seal 420a is within the sleeve 422a and fluidly decouples the outlet port 404 from the oil (or other material) surrounding the spring 424a.

Figure 5C:
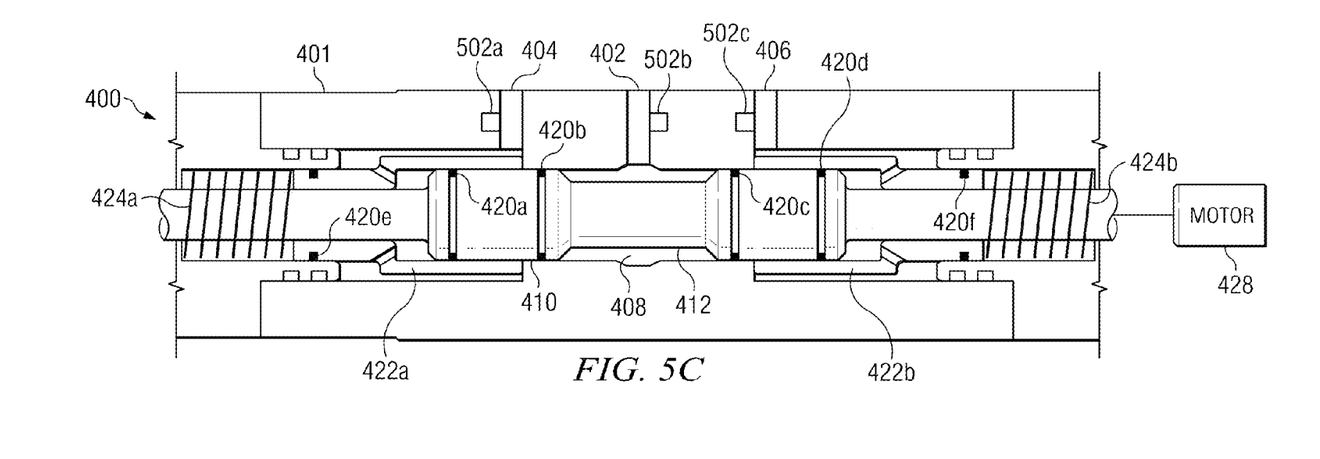
FIG. 5C is an illustration of the three-position fluid valve of FIG. 4 in a neutral position according to one or more aspects of the present disclosure.

FIG. 5C is a simplified illustration of the three-position fluid valve 400 of FIG. 4 in a neutral position. As illustrated in FIG. 5C, in the neutral position, the chamber 408 is fluidly coupled to the inlet port 402. The seals 420b and 420c fluidly decouple the chamber 408 from the outlet ports 404 and 406. The seals 420a and 420d are located within respective ones of the sleeves 422a and 422b to fluidly decouple or isolate the outlet ports 404 and 406 from the springs 424a and 424b. The spring 424a urges the sleeve 422a toward the piston bore 410, and the spring 424b urges the sleeve 422b toward the piston bore 410. While the piston 412 rests in the neutral position depicted in FIG. 5C, the sleeves 422a and 422b contact the piston bore 410.

Figure 5D:
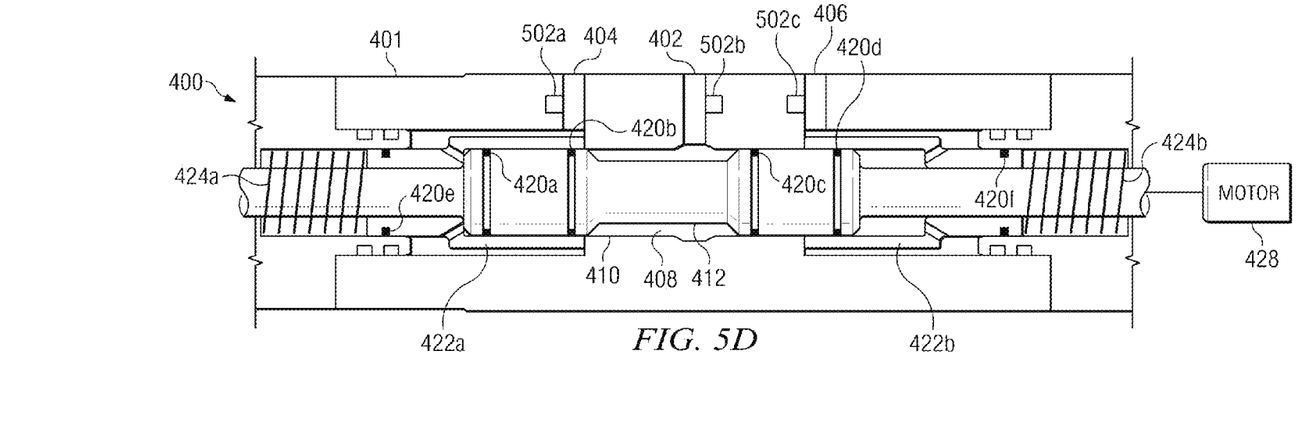
FIG. 5D is an illustration of the three-position fluid valve of FIG. 4 engaged with a second sleeve according to one or more aspects of the present disclosure.
Figure 5E:
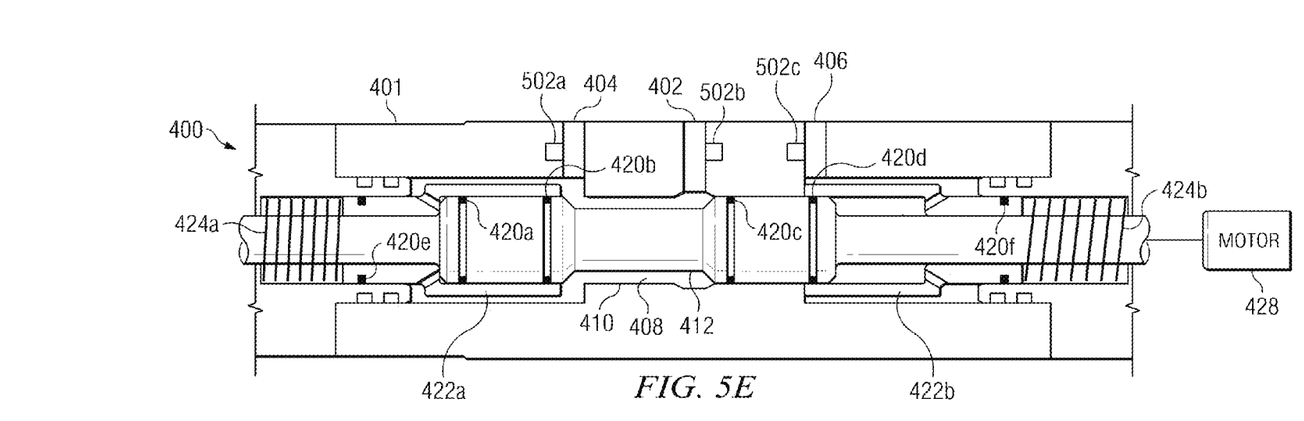
FIG. 5E is an illustration of the three-position fluid valve of FIG. 4 engaged with a second sleeve to couple the chamber to another outlet port according to one or more aspects of the present disclosure.

FIG. 5D is an illustration of the three-position fluid valve 400 of FIG. 4 engaged with the sleeve 422a but has not moved the sleeve 422a to fully fluidly couple the ports 402 and 404 as depicted in FIG. 5E. When the motor 428 moves the piston 412 from the neutral position illustrated in FIG. 5C to fluidly couple the inlet port 402 to the outlet port 404, the seals 420a and 420b enter the sleeve 422a. While the sleeve 422a is in contact with the piston bore 410, the seals 420a and 420b are protected by the sleeve 422a and do not prevent flow between the ports 402 and 404. The sleeve 422a also does not create a seal with the bore 410. Therefore, downhole fluid may flow between the ports 402 and 404, but the flow may be restricted by the sleeve 422a. The seal 420d remains within the sleeve 422b, and fluidly decouples the outlet port 406 from the oil surrounding the spring 424b.

FIG. 5E is a simplified illustration of the three-position fluid valve 400 of FIG. 4 where the piston 412 is engaged with the sleeve 422a to fully fluidly couple the chamber 408 to the outlet port 404. In the example of FIG. 5E, the motor 428 moves the piston 412 into contact with the sleeve 422a to move the sleeve 422a away from contact with the piston bore 410. As a result, the seals 420a and 420b are protected from erosion and/or extrusion by the sleeve 422a. The seal 420c fluidly decouples the inlet port 402 from the outlet port 406, and the seal 420d remains in the sleeve 422b to fluidly decouple the outlet port 406 from the spring 424b. In certain applications, the motor (or other actuation device) 428 may move the piston 412 in response to the sensors 502a and 502b detecting a pressure difference between the outlet port 404 and the inlet port 402.

Figure 5F:
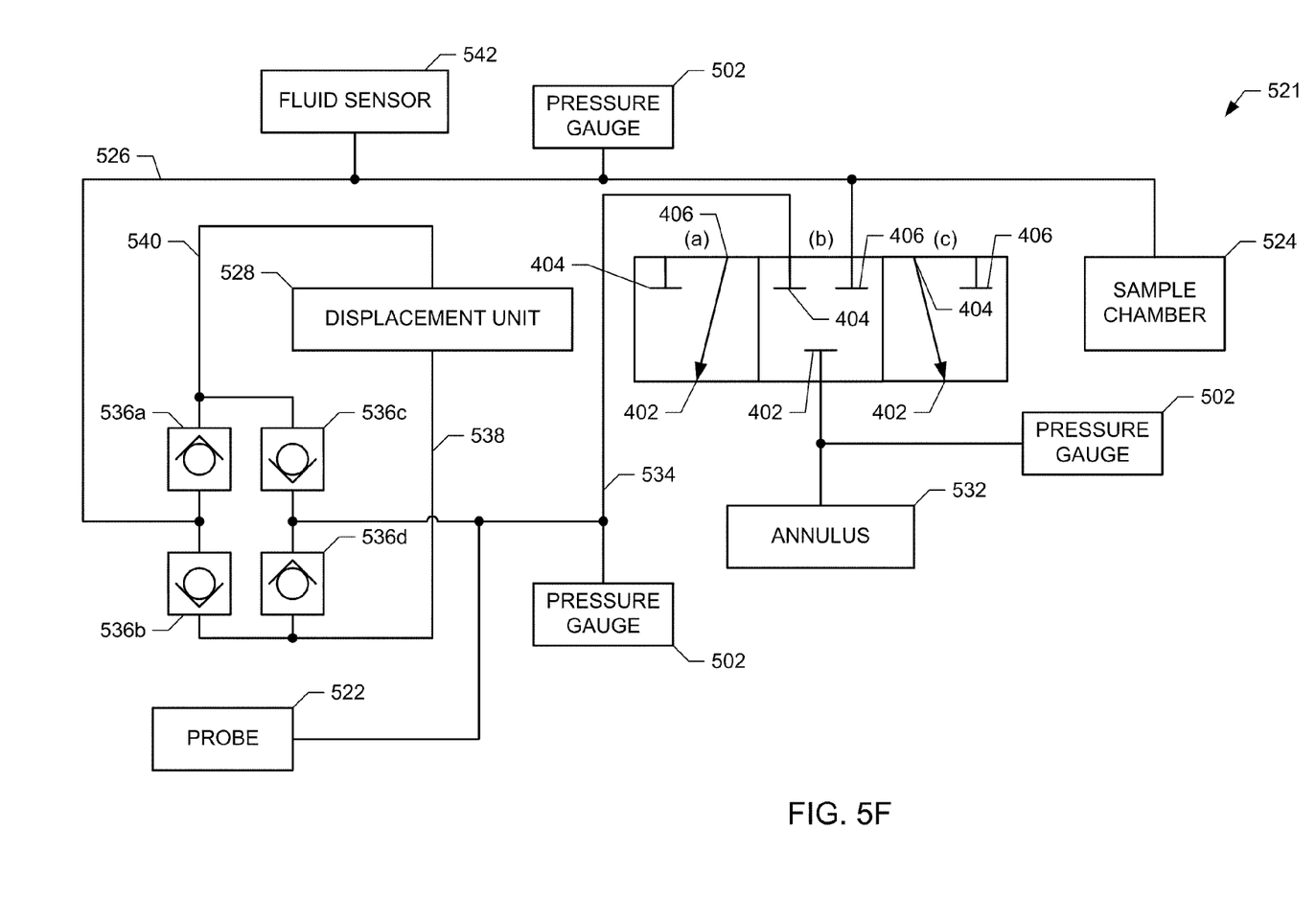
FIG. 5F is a block diagram of an example formation fluid sampling system that may implement the example three-position fluid valve according to one or more aspects of the present disclosure.

FIG. 5F is a block diagram of an example formation fluid sampling system 521 that may implement the example three-position fluid valve 400 described herein. The formation fluid sampling system 521 may be implemented in connection with, for example, the LWD tool 200 illustrated in FIG. 2 and/or the wireline tool 300 illustrated in FIG. 3. The example formation fluid sampling system 521 includes a probe 522 to be fluidly coupled to a subterranean formation (e.g., the formation F illustrated in FIGS. 1-3) to collect formation fluid in a sample chamber 524. A sampling line 526 couples fluid from the probe 522 to the sample chamber 524 via mud check valves 536a, 536b, 536c, and 536d. The example three-position fluid valve 400 is also connected to the sampling line 526 (e.g., at the port 406). The example formation fluid sampling system 521 may further include a displacement unit 528 to draw fluid via the probe 522 and to pump the fluid through the sampling line 526.

In FIG. 5F, the fluid valve 400 is diagrammatically depicted as having three distinct operational states. Specifically, the valve 400 may be in a state (a) in which the port 406 is fluidly coupled to the port 402; a state (b) in which neither of the ports 404 and 406 is fluidly coupled to the port 402 (i.e., a neutral state or position); or a state (c) in which the port 404 is fluidly coupled to the port 402. The pressure sensors or gauges 502 may be coupled to any or all of the sampling line 526, the equalization line 534, and/or the annulus 532.

As depicted in the example fluid sampling system 521, when the fluid valve 400 is in state (a), the sample line 526 is fluidly coupled to an annulus 532 via the ports 406 and 402. In state (b), an equalization line 534 and the fluid sample line 526 are fluidly decoupled or isolated from the annulus 532. In state (c), the equalization line 534 is fluidly coupled to the annulus 532 via the ports 404 and 402.

In an example operation, the formation fluid sampling system 521 first establishes fluid communication with the formation F via the probe 522. The initial fluid collected via the probe 522 is usually contaminated with drilling fluid or mud that penetrates the formation F. To improve the quality of the fluid sample collected from the formation F, the formation fluid sampling system 521 draws fluid from the formation F via the probe 522 to clean or decontaminate the fluid in the sample line 526. Specifically, the example three-position fluid valve 400 is operated in state (a) to fluidly couple the port 402 to the port 406, thereby fluidly coupling the annulus 532 to the sample line 526. With reference to FIG. 4, to operate the valve in state (a), the example piston 412 moves to displace the sleeve 422b out of contact with the piston bore 410. Additionally, the chamber 408 is moved to fluidly couple the inlet port 402 to the outlet port 406 as described above.

The displacement unit 528 operates to alternate between drawing fluid via a line 538 while expelling fluid via a line 540, and drawing fluid via the line 540 while expelling fluid via the line 538. While in state (a), the fluid valve 400 fluidly couples the sample line 526 to the annulus 532 via the ports 406 and 402. As a result, the line 534 does not provide a fluid flow path. Under these conditions, operation of the displacement unit 528 draws fluid (e.g., from a formation) via the probe 522 and the mud check valves 536c and 536d and pumps the drawn or sampled fluid via the mud check valves 536a and 536b through the sample line 526. However, with the fluid valve 400 in state (a), the fluid being pumped by the displacement unit 528 through the sample line 526 is expelled to the annulus 532. Pumping of the sample fluid into the annulus 532 enables, for example, dirty sample fluid to be expelled to the annulus 532 rather than collected.

The fluid valve 400 may remain in state (a) to allow sample fluid to be pumped to the annulus 532 until, for example, a sample cleanup operation has been completed. More specifically, a fluid sensor 542 may be used to determine that the fluid in the sample line 526 is clean and the fluid valve 400 may be operated to be in state (b) (i.e., the neutral state or position). In state (b), the ports 404 and 406 of the valve 400 are fluidly isolated from the port 402 and, as a result, operation of the displacement unit 528 causes sample fluid to be drawn via the probe 522 and pumped via the check valves 536a-d and the sample line 526 to the sample chamber 524 for collection.

When the sampling chamber 524 has collected a sufficient fluid sample, the probe 522 may have difficulty retracting from the formation F due to the low pressure at the probe 522 relative to the annulus 532. To equalize the pressure, with reference to FIG. 4, the piston 412 moves or displaces the sleeve 422a to fluidly couple the port 402 to the port 404 as illustrated in state (c). As a result, the equalization line 534 and the probe 522 are fluidly coupled to the annulus 532. Allowing fluid to move freely between the annulus 532 and the equalization line 534 reduces or eliminates any pressure difference between the probe 522 and the formation F.

FIGS. 6A-6D are diagrams illustrating example outlet port configurations 602, 604, 606 and 608 that may be used to implement the outlet ports 404 and 406 of the example three-position fluid valve 400 described in FIG. 4. The position and sizing of the output port configurations 602-608 may be optimized to streamline the flow of fluid within the three-position fluid valve 400 to prevent vortices and/or erosion. The port configurations 602-608 may also evenly distribute static pressure to prevent cavitations and/or evenly distribute dynamic pressure to prevent seal extrusion and/or erosion.

Figure 6A:
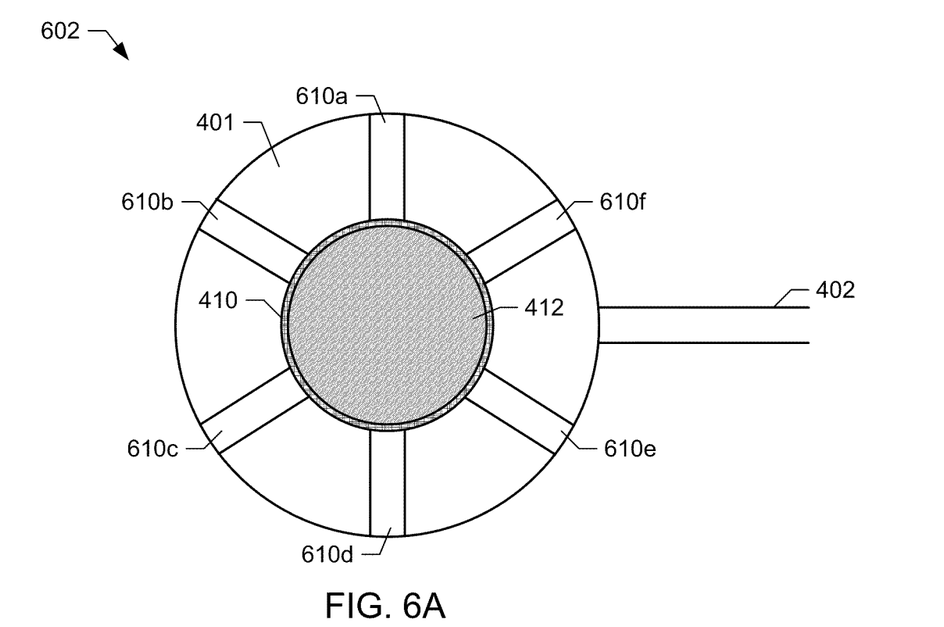
FIGS. 6A-6D are diagrams illustrating example outlet port configurations that may be used to implement the outlet ports of a three-position fluid valve according to one or more aspects of the present disclosure.

FIG. 6A illustrates an example outlet port configuration 602 having six substantially equally spaced ports 610a-610f directed radially outward from the piston bore 410 to the outside of the valve housing 401. In general, the ports 610a-610f are fluidly coupled to the inlet port 402 at substantially the same time when the piston 412 moves or displaces one of the sleeves 422a or 422b. The ports 610a-610f may have a diameter greater than 0.218 inches to permit substantial fluid flow through the area of the piston bore 410. However, any other port diameter could be used. Further, while six equally spaced ports are shown in the example of FIG. 6A, any other number of ports may be used and/or spaced in any other manner. For example, ports may be disproportionately concentrated in an angular region based on the location(s) of the inlet port(s) 402.

Figure 6B:
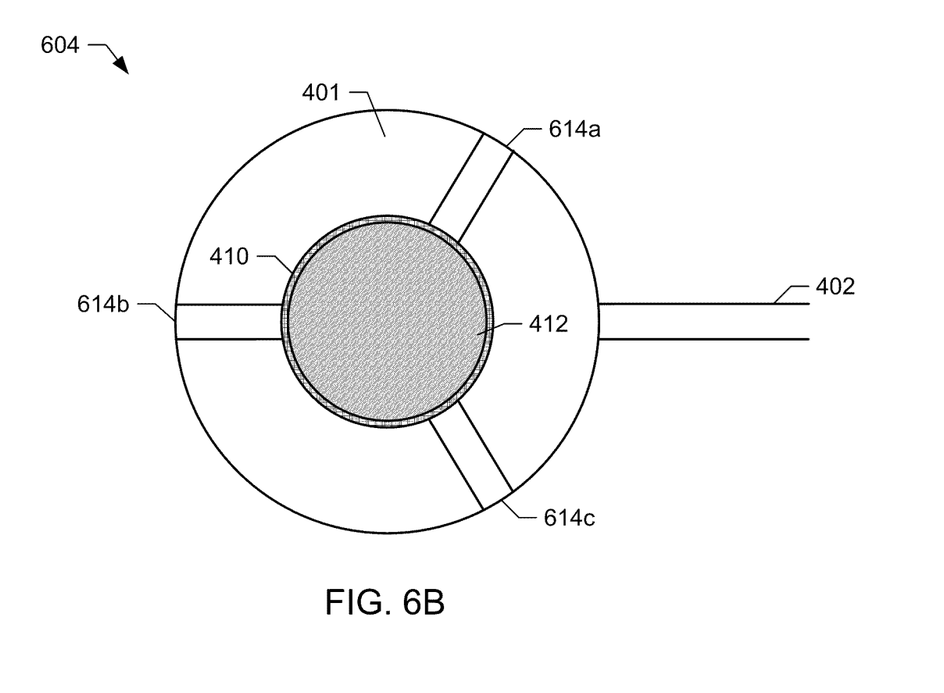

FIG. 6B illustrates an example outlet port configuration 604 having three substantially equally-spaced ports 614a-614c. The example ports 614a-614c distribute fluid flow between the inlet port 402 and the ports 614a-614c around the circumference of the piston 412 (compared to the ports 610a-610f).

Figure 6C:
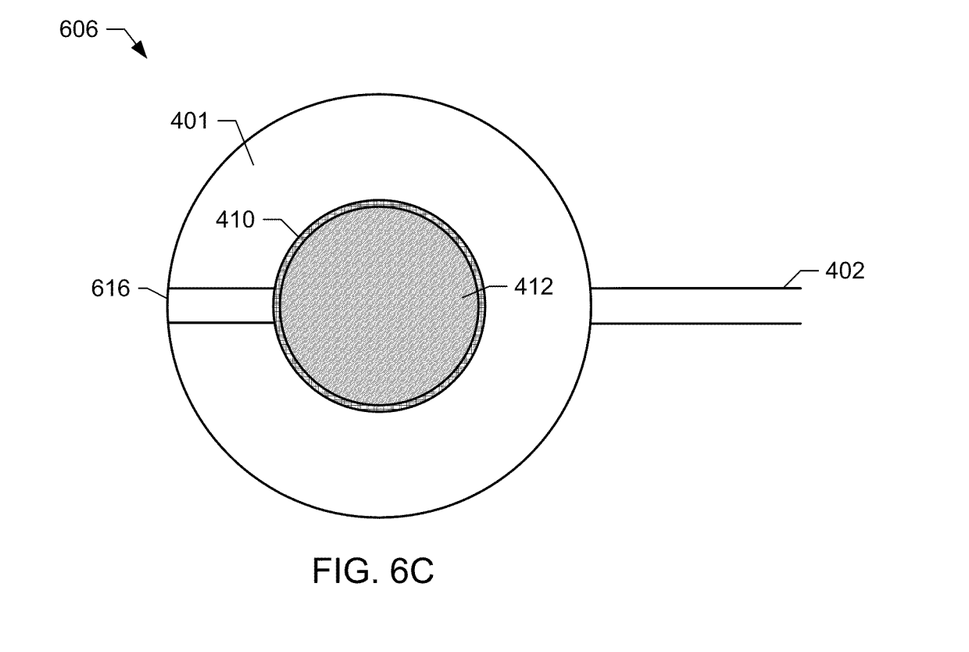

FIG. 6C illustrates an example outlet port configuration 606 having one port 616 to implement the outlet port 404 or 406. The example port 616 may have a diameter greater than or equal to 0.218 inches to decrease erosion of the piston bore 410. While the port configuration 606 increases fluid speed, the single outlet port 616 may be easier to manufacture than the configurations 602, 604 and 608. The example configuration 606 may be used, for example, in situations where a small amount of particulate matter is expected in the downhole fluid or only small pressure differences are expected between the ports 402-406. Additionally or alternatively, the example configuration 606 may be used to direct fluid to and/or from a fluid passage (e.g., hose, pipe) coupled to the port 616. In contrast to the configurations 602, 604 and 608, which have multiple ports that generally direct fluid between the inside and outside of the housing 401, the single port 616 may be more conducive to directing fluid to and/or from a remote location via an extended fluid passage such as a hose.

Figure 6D:
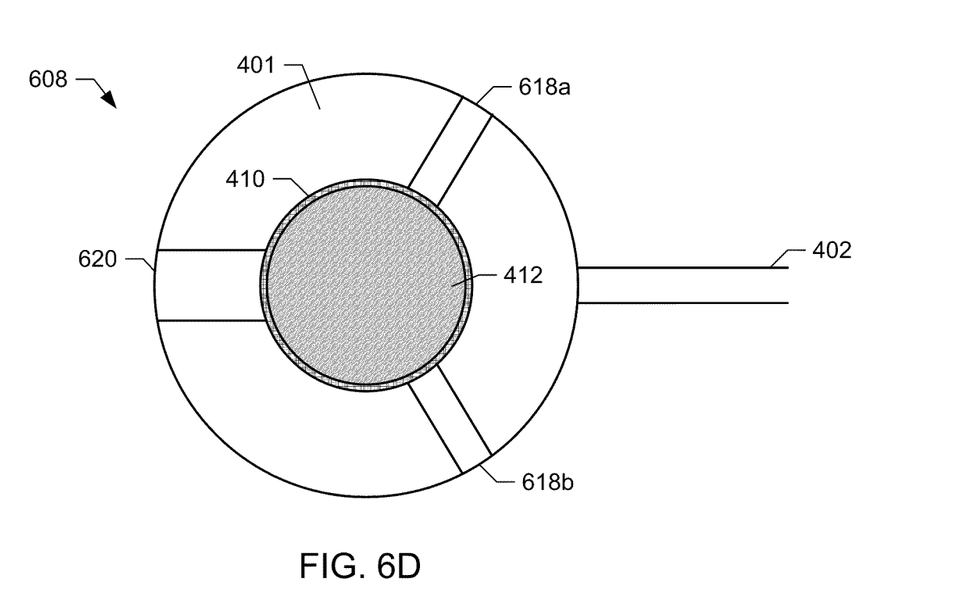

FIG. 6D illustrates an example outlet port configuration 608 having two similarly or identically sized outlet ports 618a and 618b and a relatively larger outlet port 620. In one example, the diameter of each of the outlet ports 618a and 618b may be 0.218 inches or more, and the diameter of the outlet port 620 may be 0.5 inches or more. The larger port diameter further distributes the fluid flow by increasing flow area opposite the entry port and, thus, may reduce erosion, cavitations, and seal extrusion in the piston bore 410 or on the piston 412.

Figure 7:
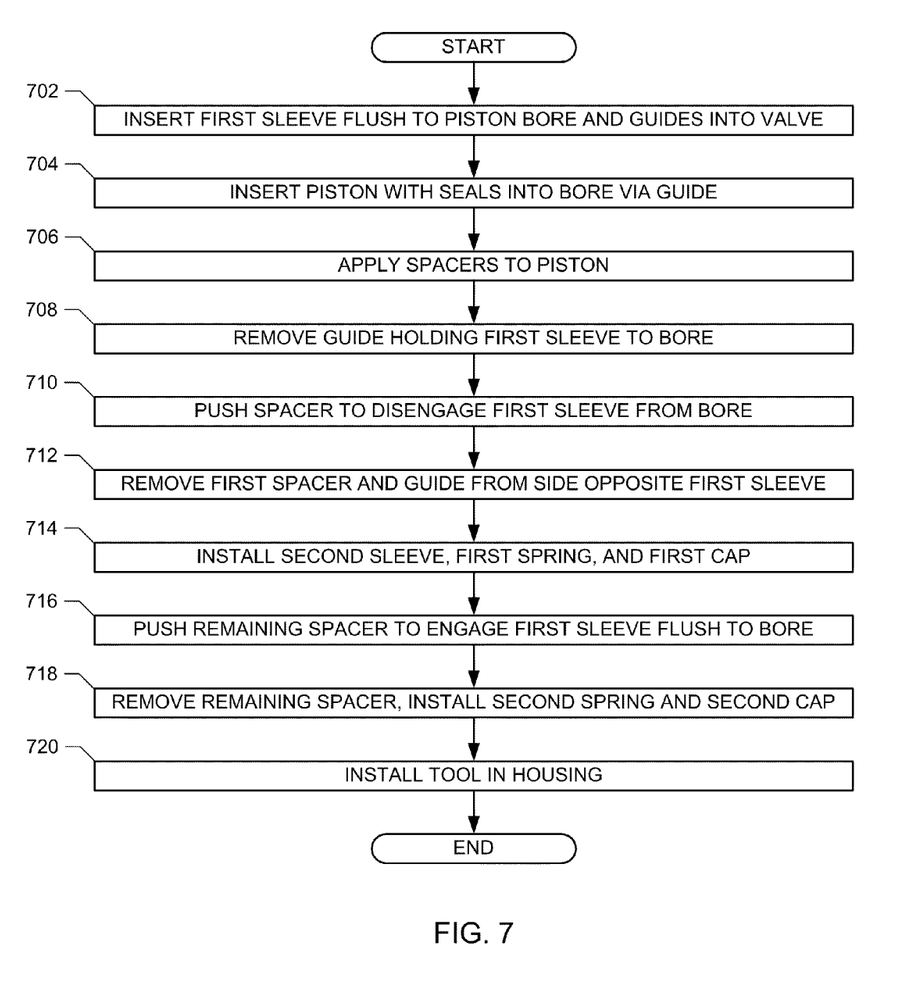
FIG. 7 is a flowchart illustrating an example process to manufacture a three-position fluid valve according to one or more aspects of the present disclosure.

FIG. 7 is a flowchart illustrating an example method 700 to assemble the example three-position fluid valve 400 described above. The example method 700 may be used to prevent damage to the seals 420a-420d and/or the piston 412 during assembly of the valve 400. The method 700 will also be described in conjunction with diagrams depicting the example valve 400 at different stages of assembly (FIGS. 8A-8H).

Figure 8A:
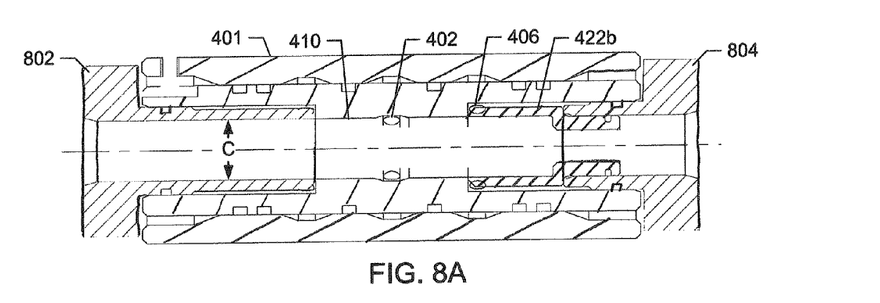
FIGS. 8A-8H are schematic diagrams illustrating example manufacturing steps to manufacture a three-position fluid valve according to one or more aspects of the present disclosure.

The assembly method 700 begins with the valve 400 having the inlet 402 and the outlet ports 404 and 406 drilled from the piston bore 410 to the outside of the housing 401. A first one of the sleeves 422b and two guides 802 and 804, shown in FIG. 8A, are inserted into the valve housing 401 (block 702). When inserted, the guide 804 pushes the sleeve 422b into contact with the piston bore 410. The guide 802 is also pushed or urged into contact with the bore 410. In this example, the guide 802 has an inner diameter substantially equal to the inner diameter of the piston bore 410. However, in other examples, the guide 802 has a decreasing (e.g., tapered) inner diameter C as the piston 412 approaches the piston bore 410, which facilitates insertion of the piston 412 into the guide 802. Alternatively, the guide 802 may be tapered, beveled, and/or chamfered at the opening of the guide 802 and have a substantially constant inner diameter C to allow insertion of the piston 412 and immediate compression of the seals 420a-420d between the piston 412 and the guide 802 upon insertion of the piston 412.

Figure 8B:
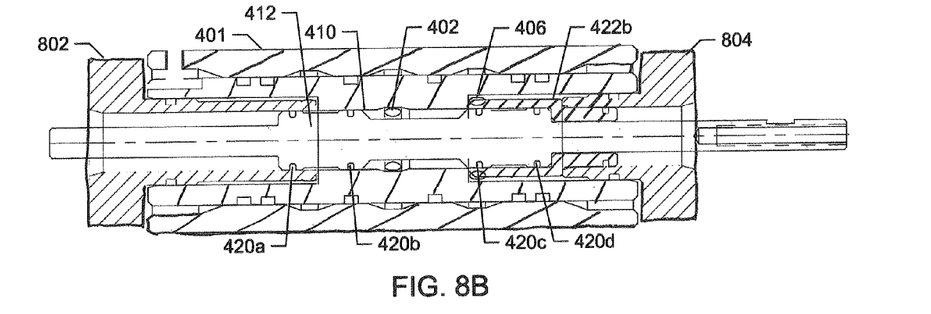
Figure 8C:
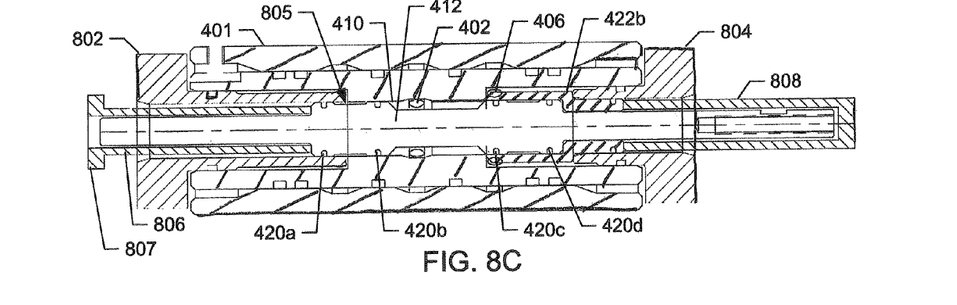

From the end opposite the sleeve 422b, the piston 412 is inserted into the piston bore 410 via the guide 802 (block 704). FIG. 8B illustrates the valve 400 after the completion of block 704. While the piston 412 is inserted via the guide 802, the seals 420a-420d are compressed between the guide 802 and the piston 412, and the guide 802 protects the seals from traversing a sharp corner or edge (e.g., the transition 805 from the guide 802 to the bore 410). Spacers 806 and 808 are then applied to the piston 412 (block 706). FIG. 8C illustrates the valve 400 after completion of block 706. The example spacer 806 includes a head 807 to prevent the spacer 806 from being pushed entirely inside the guide 802.

Figure 8D:
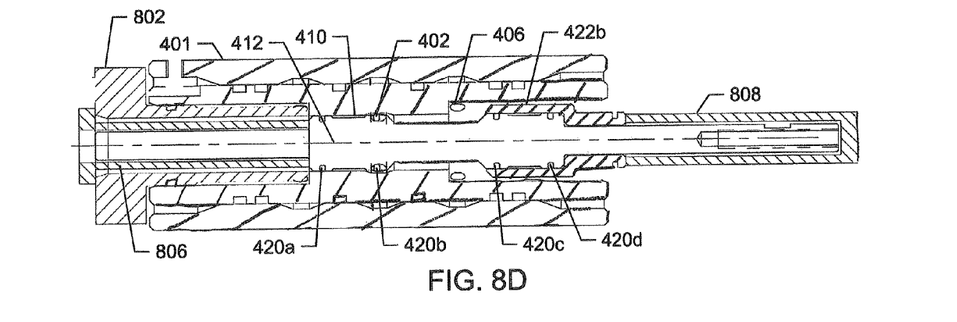
Figure 8E:
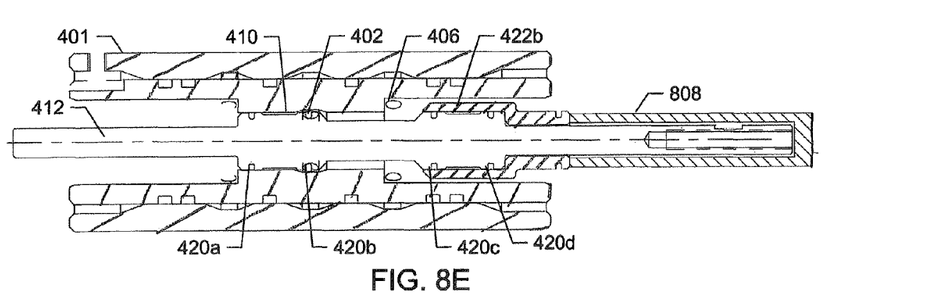

The guide 804, which holds the first sleeve 422b against the bore 410, is then removed (block 708). The spacer 806 is pushed toward the guide 802 to push the piston 412 into the first sleeve 422b and to partially displace the first sleeve 422b (block 710). FIG. 8D illustrates the valve 400 after completion of blocks 708 and 710. The guide 802 and the spacer 806 are then removed from the piston 412 (block 712). FIG. 8E illustrates the valve 400 after completion of block 712.

Figure 8F:
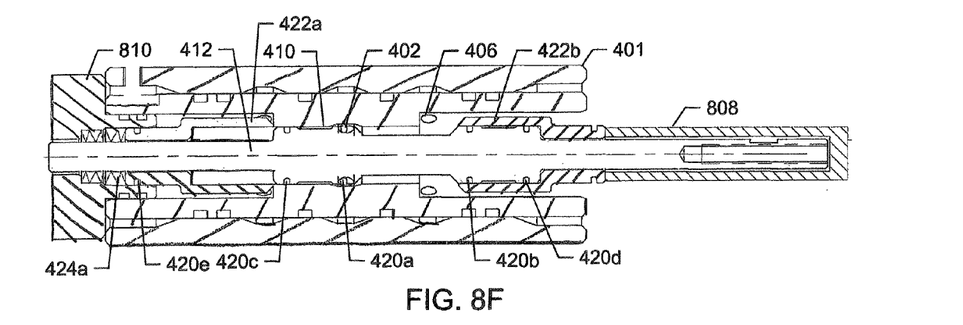
Figure 8G:
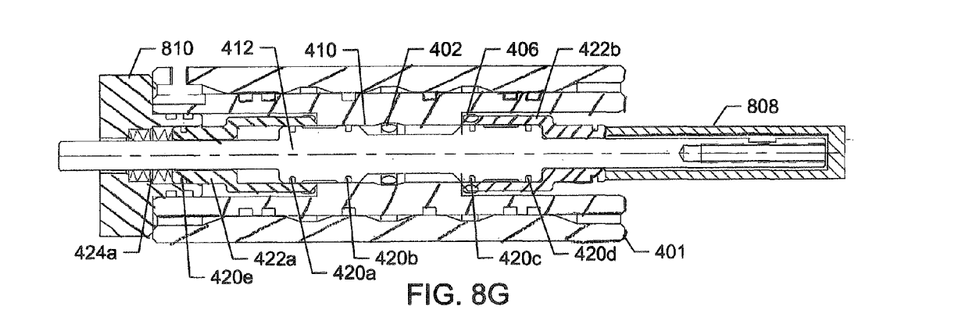
Figure 8H:
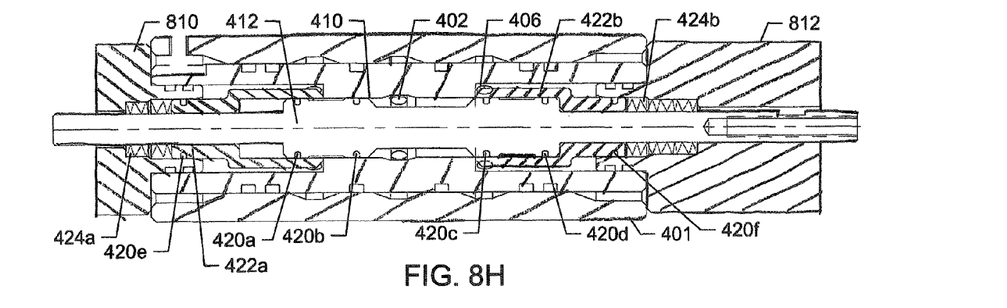

When the guide 802 and the spacer 806 are removed (block 712), the second sleeve 422a, the spring 424a and an end cap 810 are installed (block 714). The end cap 810 may be fastened to the housing 401 by, for example, a bolt, clip, or any other appropriate fastener(s). FIG. 8F illustrates the valve 400 after installation of the second sleeve 422a, the spring 424a and the end cap 810. The end cap includes the seal 420e to prevent drilling fluid from accessing the spring 424a. After installing the second sleeve 422a, the spacer 808 is pushed to engage the first sleeve 422b flush to the piston bore 410 (block 716). FIG. 8G illustrates the valve 400 after pushing the spacer 808. The spacer 808 is then removed from the piston 412 (block 718). A second spring 424b and a second end cap 812 are installed onto the sleeve 422b. The end cap 812 also includes the seal 420f to prevent drilling fluid from accessing the spring 424b. FIG. 8H illustrates the valve 400 after installation of the second spring 424b and the second end cap 812. The valve 400 may then be installed into an appropriate downhole conveyance, such as a drillstring 12 and/or a wireline tool 300 such as those described above in FIGS. 1-3.

In view of the above and the figures, it would be clear that the present disclosure introduces an example fluid valve for use in a downhole environment. The example fluid valve includes a first port, a second port, a third port, a chamber fluidly coupled to the second port, a first slidable sleeve to selectively fluidly couple the first port to the chamber and the second port and a second slidable sleeve to selectively fluidly couple the third port to the chamber and the second port. The example fluid valve further includes a piston that forms at least part of the chamber and which is operatively coupled to the sleeves. The example piston moves between a first position in which the first sleeve is displaced by the piston to fluidly couple the first port to the chamber and the second port, a second position in which neither sleeve is displaced by the piston so that neither of the first and third ports is fluidly coupled to the second port and a third position in which the second sleeve is displaced by the piston to fluidly couple the third port to the chamber and the second port.

The present disclosure also introduces a method to route fluid in a downhole environment, including moving a piston and a chamber in a first direction to displace a first sleeve and fluidly coupling the chamber to a first port in response to the displacement of the first sleeve. The example method also includes moving the piston and the chamber in a second direction to fluidly decouple the chamber from the first port and to displace a second sleeve. The example method fluidly couples the chamber to a second port in response to the displacement of the second sleeve, and moves the piston and the chamber in the first direction to return the second sleeve.

The present disclosure also introduces a downhole environment fluid routing system, which includes means to convey a three-position fluid valve to a position within a borehole. The example fluid valve includes a piston located within a piston bore, one or more inlet ports to permit fluid flow between the piston bore and a second downhole location and a first outlet port on a first end of the piston bore and a second outlet port on a second end of the piston bore, where the inlet port is located between the first and second outlet ports. The example fluid valve further includes a first sleeve to selectively fluidly couple the first outlet port to the one or more inlet ports in response to the piston displacing the first sleeve, a second sleeve to selectively fluidly couple the second outlet port to the one or more inlet ports in response to the piston displacing the second sleeve and a chamber to selectively fluidly couple the one or more inlet ports to one of the outlet ports at a time. The example chamber moves based on movement by the piston within the piston bore. The system may further comprise a motor operatively coupled to the piston to move the piston within the piston bore to one or more of a first position to displace the first sleeve with the piston, a second position to displace the second sleeve with the piston, or a neutral position. The chamber may include space between the piston and the piston bore. The first sleeve may comprise a shoulder configured to make contact with the piston. The first position may fluidly couple the chamber to the first outlet port. The system may further comprise a first spring coupled to the first sleeve to urge the first sleeve toward a piston bore to decouple the chamber from the first port. The system may further comprise one or more pressure sensors configured to determine a pressure difference between the inlet port and the first or second outlet port.

The present disclosure also introduces a method to manufacture a three-position fluid valve to prevent seal breakage or damage during manufacture of the fluid valve. The example method includes engaging a first sleeve flush to a piston bore and inserting a piston carrying one or more seals into the piston bore via a bore guide, where the seals traverse a substantially continuous cylinder from the bore guide to the piston bore. The example method also involves pushing the piston to engage the piston to the first sleeve and to disengage the first sleeve from the piston bore, installing a second sleeve and a first spring to exert force on the second sleeve, engaging the first sleeve flush to the piston bore and installing a second spring to exert force on the first sleeve. The bore guide may comprise an inner diameter substantially equal to an inner diameter of the piston bore and a beveled opening opposite the piston bore. Engaging the first sleeve flush to the piston bore may comprise inserting a spacer to hold the first sleeve flush to the piston bore. The method may further comprise removing the spacer prior to installing the second spring. One or more of the seals may comprise an o-ring configured to fluidly decouple first and second portions of the piston bore. The method may further comprise adding lubricating fluid to one or more of the piston bore, the first spring or the second spring.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A fluid valve, comprising:
   a first port;
   a second port;
   a third port;
   a chamber fluidly coupled to the second port;
   a first slidable sleeve configured to selectively fluidly couple the first port to the chamber and the second port;
   a second slidable sleeve configured to selectively fluidly couple the third port to the chamber and the second port;
   a piston forming at least part of the chamber and operatively coupled to the sleeves, wherein the piston is configured to move between:
   a first position in which the first sleeve is displaced by the piston to fluidly couple the first port to the chamber and the second port;
   a second position in which neither sleeve is displaced by the piston so that neither of the first and third ports is fluidly coupled to the second port; and
   a third position in which the second sleeve is displaced by the piston to fluidly couple the third port to the chamber and the second port; and
   a seal coupled to the piston and configured to fluidly decouple the chamber from at least one of the first port and the third port, wherein the seal is protected by one of the first and second sleeves when the piston engages the respective sleeve.

2. The fluid valve of claim 1 further comprising a motor coupled to the piston and configured to selectively cause the piston to engage the first sleeve, engage the second sleeve, or disengage the first and second sleeves.

3. The fluid valve of claim 1 wherein the first port comprises an opening having a diameter of at least 0.218 inch.

4. The fluid valve of claim 1 further comprising a piston bore encompassing at least the chamber, wherein the piston bore has an inner diameter substantially equal to an inner diameter of the first sleeve.

5. The fluid valve of claim 1 wherein the first port comprises an opening directed radially outward from a piston bore.

6. The fluid valve of claim 1 further comprising a first spring coupled to the first sleeve and configured to urge the first sleeve toward a piston bore.

7. The fluid valve of claim 6 further comprising a second spring coupled to the second sleeve and configured to urge the second sleeve toward the piston bore.

8. The fluid valve of claim 6 wherein the piston engages the first sleeve to equalize a pressure difference between the second port and the first port.

9. The fluid valve of claim 8 wherein the piston disengages the first sleeve to decouple the chamber from the first port.

10. The fluid valve of claim 1 further comprising a pressure sensor configured to determine a pressure difference between the second port and the first port or the third port.

11. The fluid valve of claim 10 wherein the piston engages the first sleeve or the second sleeve in response to the pressure difference.

12. A method, comprising:
moving a piston forming at least part of a chamber, fluidly coupled to a second port, in a first direction to a first position to displace a first slidable sleeve;
fluidly coupling a first port to the chamber and the second port in response to the displacement of the first slidable sleeve;
moving the piston and the chamber in a second direction to a third position to fluidly decouple the chamber from the first port and to displace a second slidable sleeve, wherein a seal coupled to the piston fluidly decouples the chamber from the first port, and wherein the seal is protected by one of the first and second slidable sleeves when the piston engages the respective sleeve;
fluidly coupling a third port to the chamber and the second port in response to the displacement of the second slidable sleeve; and
moving the piston and the chamber in the first direction to a second position to return the second slidable sleeve to fluidly decouple the third port from the chamber and the second port.

13. The method of claim 12 further comprising determining a pressure difference between the chamber and one of the first and third ports.

14. The method of claim 12 wherein moving the piston and the chamber is in response to determining a pressure difference between the chamber and one of the first and third ports.

15. The method of claim 12 wherein the chamber comprises space between the piston and a piston bore.

16. The method of claim 12 wherein the second position comprises a neutral position in which the chamber and the second port are fluidly decoupled from the first and third ports.

17. The method of claim 12 wherein the piston comprises an additional seal to fluidly decouple the chamber from the third port.

18. The method of claim 12 further comprising:
disengaging the first slidable sleeve to fluidly decouple the first port from the chamber; and
disengaging the second slidable sleeve to fluidly decouple the third port from the chamber.

19. The method of claim 17, wherein the additional seal is protected by one of the first and second slidable sleeves when the piston engages the respective sleeve.

20. The method of claim 12, wherein the seal is protected by the first slidable sleeve when the piston engages the first slidable sleeve.

* * * * *